O. W. FISHER.
POTATO PLANTER.
APPLICATION FILED NOV. 10, 1906.

912,457.

Patented Feb. 16, 1909.
5 SHEETS—SHEET 1.

Witnesses
Howard D. Orr.
H. F. Riley

Inventor,
Oliver W. Fisher,
E. G. Siggers
Attorney

O. W. FISHER.
POTATO PLANTER.
APPLICATION FILED NOV. 10, 1906.

912,457.

Patented Feb. 16, 1909.
5 SHEETS—SHEET 5.

UNITED STATES PATENT OFFICE.

OLIVER W. FISHER, OF JERSEY SHORE, PENNSYLVANIA.

POTATO-PLANTER.

No. 912,457.

Specification of Letters Patent.

Patented Feb. 16, 1909.

Application filed November 10, 1906. Serial No. 342,884.

*To all whom it may concern:*

Be it known that I, OLIVER W. FISHER, a citizen of the United States, residing at Jersey Shore, in the county of Lycoming and State of Pennsylvania, have invented a new and useful Potato-Planter, of which the following is a specification.

The invention relates to improvements in potato planters.

The object of the present invention is to improve the construction of potato planters, and to provide a simple, efficient and comparatively inexpensive one capable of opening a furrow, depositing the desired amount of fertilizer therein, dropping the potatoes accurately in the said furrow, and finally covering the potatoes.

A further object of the invention is to provide a potato planter, having rotary means carrying a plurality of devices, adapted to carry the potatoes from a hopper to a discharge spout or tube, and capable of automatically delivering a potato to the discharge spout or chute from a receptacle, independent of the hopper, should any one of the potato carrying devices fail to convey a potato from the hopper to the discharge spout or tube.

Furthermore the invention has for its object to enable the furrow opening means and the means for covering the potatoes to be readily raised and lowered either for throwing them into and out of operation, or for adjusting the same.

It is also the object of the invention to enable the covering disks to be adjusted independently of each other, and also to permit the same to move upward independently of each other, should either of them come in contact with a stone, or other obstruction.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings.

Like numerals of reference designate corresponding parts in all the figures of the drawings.

The main or supporting frame of the machine, which may be of any preferred construction, is preferably provided with opposite side bars 1, having spaced parallel portions, and provided at the front of the frame with forwardly converging portions 2, the front terminals 3 of the side bars 1 are spaced apart, and are secured to the opposite side faces of the rear end of a draft beam or tongue 4. The side bars are provided at their rear portions with bearing brackets 5, having slots or bifurcations 6 to receive the side bars 1 and suitably secured to the same. The bearing brackets 5 depend from the side bars 1, and are provided with suitable bearings 7 for the reception of an axle 8. The bearings 7 preferably consist of laterally projecting tubular portions, extending from the outer faces of the bearing brackets, as clearly illustrated in Fig. 5 of the drawings. The axle 8 is provided at its ends with suitable spindle portions for the reception of carrying wheels 9 and 10. The side bars of the main frame are connected by the axle 8, and also by a transverse rod 11, located above and slightly in rear of the axle and piercing the side bars and the upper rear portions of the bearing brackets 5, and assisting in securing the said brackets to the side bars.

The furrow, into which the potatoes are dropped, is opened by a shovel or blade 12, which tapers downwardly and which is curved horizontally to present a convex front face and a concave rear face, and the furrow opening blade or shovel 12 is secured to a similarly shaped shank 13, which is mounted between a pair of longitudinal supporting bars 14. The tapering shank 13, which is curved in horizontal section, is provided with a curved cutter or colter 15, having a forked upper portion and extending downwardly therefrom to the lower portion of the furrow opening blade. The curved cutter or colter, which is bowed forwardly, is adapted to divide the soil of the furrow so that the shovel or blade 12 will throw as much soil on one side as on the other. The lower end of the cutter or colter is secured by a clip 17, or other suitable fastening device to the lower portion of the furrow opening blade or shovel. The upper forked or bifurcated portion 16, which is formed integral with, or otherwise rigidly connected to the shank 13, is also connected to the supporting side bars 14 by a transverse pin or bolt 18, a sleeve 19 being preferably arranged on the pin or bolt to stiffen the structure. The bolt or pin 18 constitutes a pivot for the furrow opening device, which is held normally rigid with the supporting bars 14 by a breakable pin 20, constructed of wood, or any other suitable material, and arranged in suitable perforations of the shank 13 and the bars 14. Should the furrow opening device come in contact with a stone, or other obstruction liable to break or otherwise injure it, the wooden pin will break and permit the furrow opening device to swing upwardly and rearwardly, whereby the furrow opening device is enabled to pass over obstructions without being broken, or otherwise injured by the same.

The supporting bars 14, which have downwardly curved rear portions, are hung from front and rear transverse rock shafts 21 and 22, which are journaled in suitable bearings of front and rear brackets 23 and 24, and the latter are bolted or otherwise secured to the front and rear portions of the side bars 1 of the main or supporting frame. The front ends of the supporting bars 14 are spaced apart, and are connected with a pair of arms 25 of the front transverse shaft 21 by means of depending links 26. The arms 25, which extend forwardly from the transverse shaft 21, are provided at their rear ends with rectangular sleeves 27, conforming to the configuration of the body portion of the shaft 21, and adjustably secured to the same by set screws 28. The links 26 are adjustably secured to the front ends of the supporting bars 14 by means of a transverse bolt 29, and their lower portions are provided at intervals with perforation 30 to receive the bolt 29 to permit the front ends of the supporting bars to be raised and lowered independently of the arms of the rock shafts. The rear portions 31 of the supporting bars are converged, and their terminals 32 are secured together and to the lower ends of a pair of links 33, which connect the rear ends of the supporting bars 14 with an arm 34 of the rear transverse rock shaft 22. The arm 34, which extends forwardly from the rear rock shaft 22, is provided with a rectangular sleeve to receive the body portion of the said shaft 22, and it is secured to the same by a set screw 35. The links 33, which are spaced apart to receive the arm 34 of the rear ends 32 of the supporting bars 14, are provided at their lower ends with perforations 36 for a bolt 37, or other suitable fastening device for pivoting the rear ends of the bars 14 to the links. The rear ends 32 of the bars 14 are also provided with perforations, and are adjustably connected with the links. The perforations of the links permit the rear ends of the supporting bars 14 to be raised and lowered independently of the rear rock shaft, and the perforations of the rear ends of the bars 14 permit the lower ends of the links to be adjusted backwardly and forwardly.

The front and rear transverse rock shafts are provided at the right hand side of the machine with upwardly extending arms 38 and 39, which are connected by a rod or bar 40, whereby the rock shafts are caused to rock in unison when they are operated for raising and lowering the supporting bars 14 to lift the furrow opening device out of the ground and to force it into the same.

When the furrow opening device is subjected to rearward pressure, incident to the forward movement of the machine, the links 26 and 33 and the supporting bars 14, which carry the furrow opening device, are prevented from swinging rearwardly by means of a pair of inclined front braces 41, pivoted at their front ends 42 to the draft bar or beam, and connected at their rear ends with the lower ends of the links 26 and with the front ends of the supporting bars 14, by the transverse bolt 29. The connecting braces or links 41 do not interfere with the upward and downward movement of the bars 14.

Figure 1:
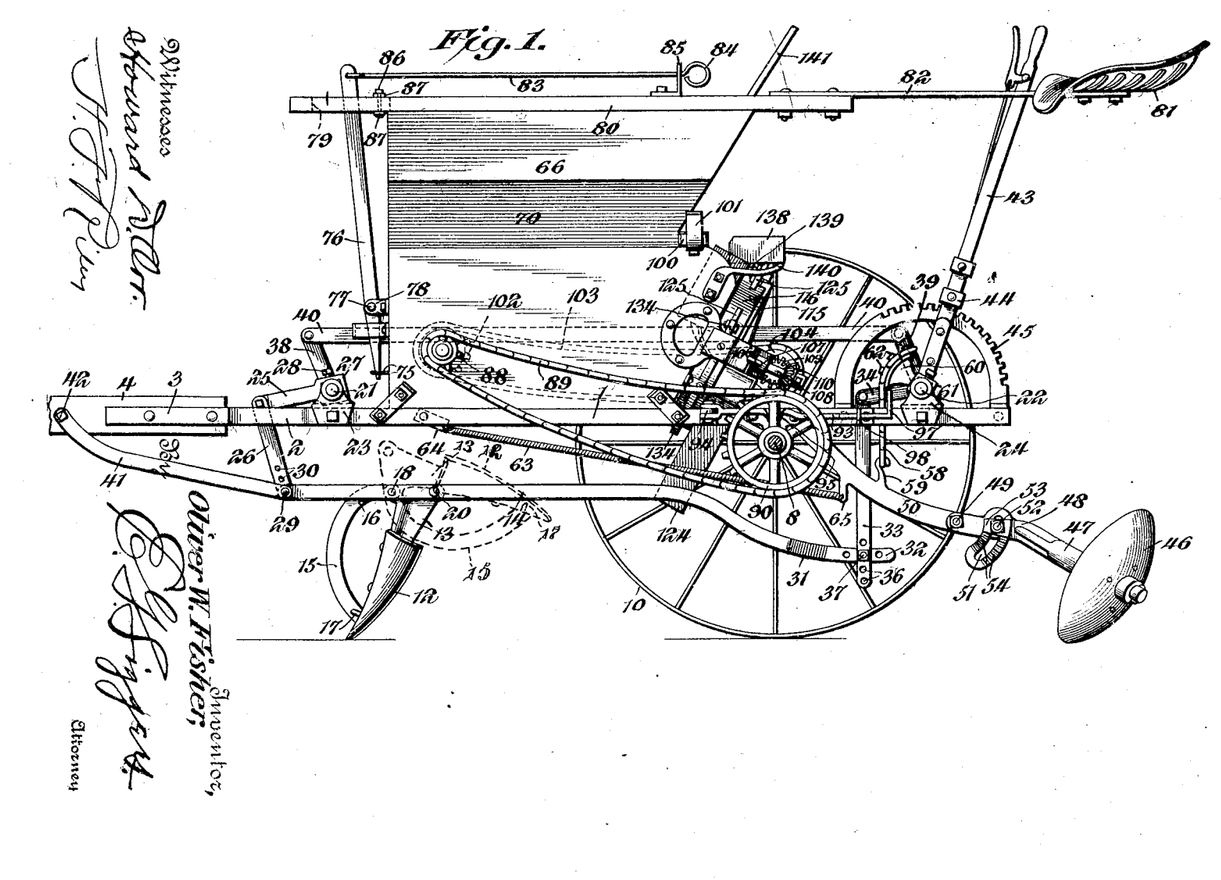
—Figure 1 is a side elevation of a potato planter, constructed in accordance with this invention.
Figure 2:
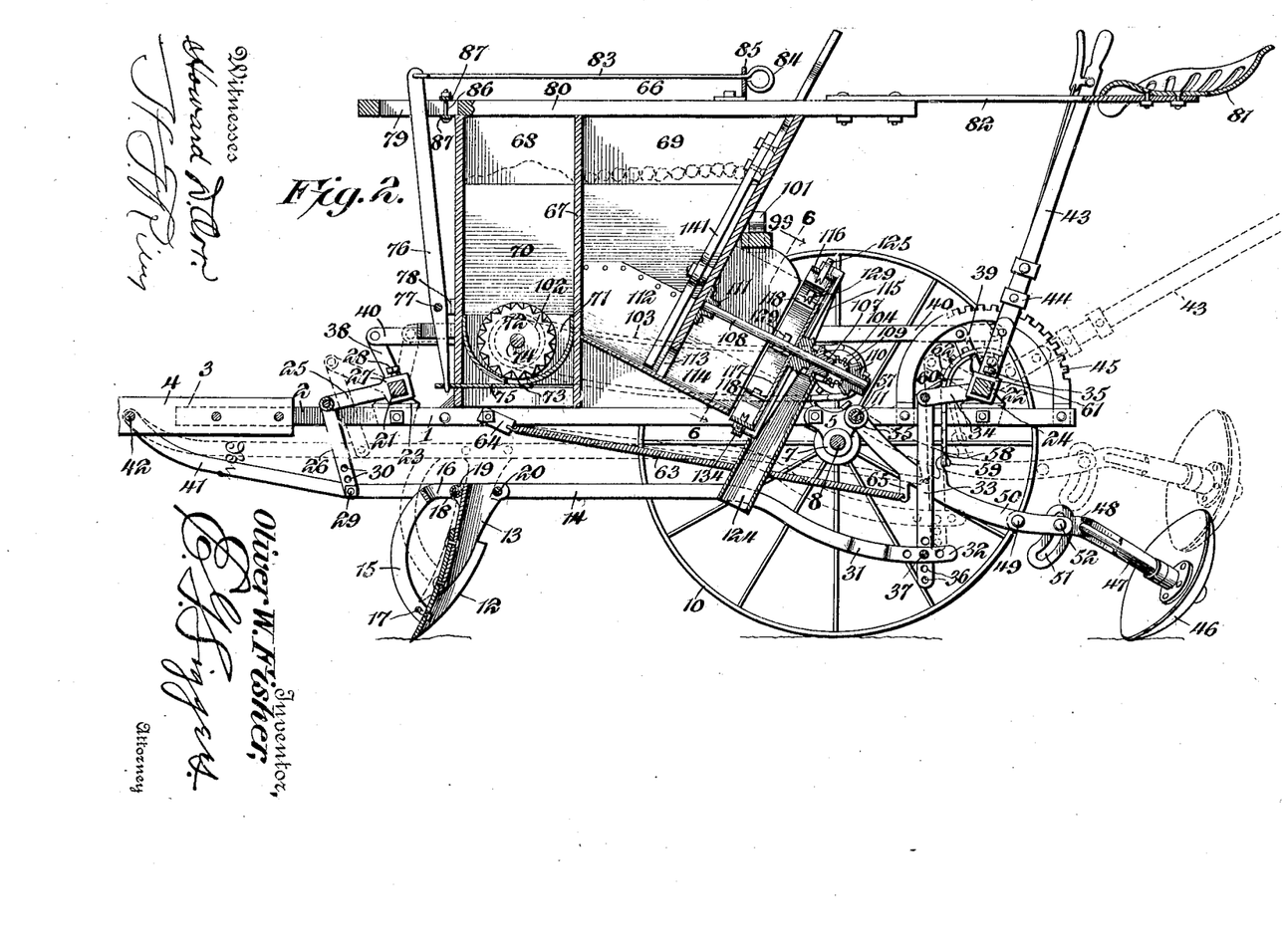
Fig. 2 is a sectional longitudinal view.
Figure 3:
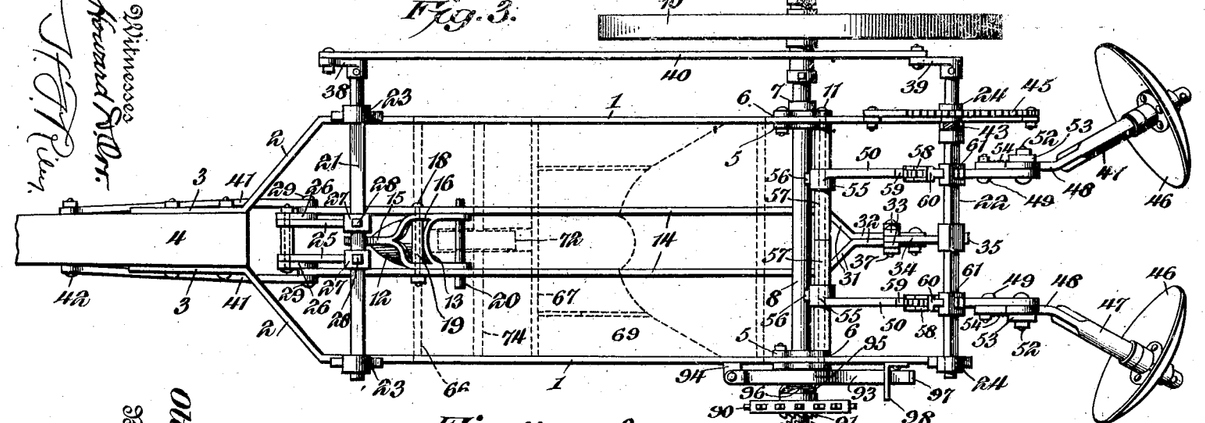
Fig. 3 is a plan view of the main frame, illustrating the arrangement of the furrow opening blades and the seed covering disks.

The furrow opening device is adjusted by means of an operating lever 43, suitably fixed to the rear transverse shaft 22 and provided with a spring actuated dog or detent 44 for engaging an arcuate ratchet-bar 45. The ratchet bar or member, which may be of any desired construction, is provided with an arcuate series of teeth, and it is preferably secured to the side bar 1 at the right hand side of the supporting frame. The operating lever is provided adjacent to its grip or handle portion with a latch lever for actuating the spring actuated dog or detent 44. The operating lever 43 is also adapted for raising and lowering a pair of seed covering disks 46, which are raised and lowered simultaneously with the furrow opening device. The seed covering disks, which are set at an angle, as clearly illustrated in Figs. 3 and 5 of the drawings, are mounted on inclined rearwardly diverging bars or members 47, which have parallel front attachment portions or shanks 48, which are pivoted at their front ends by rivets 49, or other suitable fastening devices to oscillatory arms 50. The shanks or attachment portions of the bars or members 47 are enlarged at the rear ends of the arms 50, and are provided with arcuate slots 51, which receive bolts, or other suitable fastening devices 52. The bolts 52, which also pierce the rear ends of the arms 50, pass through clamping plates 53, provided at their inner faces with corrugations or teeth for engaging corresponding corrugations or teeth 54 of the enlarged portions of the shanks 48. The bolts and the clamping plates secure the bars or members 47 in their adjustment, and enable the covering disks 46 to be adjusted independently of the operating mechanism for raising and lowering the disks and the furrow opening device. The corrugations or teeth of the enlarged portions of the shanks are located at opposite sides of the arcuate slots.

The arms 50, which are arranged at an inclination, extend downwardly and rearwardly from the transverse rod 11, and they are provided at their upper or front ends with integral collars or eyes 55, which are secured by clamping screws 56, or other suitable means to sleeves 57, arranged on the rod 11 and extending from the same to the median line of the machine, and adapted to brace the main frame at the rear portion thereof and prevent any inward movement of the side bars. The sleeves are adapted to rotate on the rod 11, and they are capable of independent rotation to permit either of the seed covering disks to move upward independently of the other, whereby the disks are prevented from being broken or otherwise injured by stones and other obstructions. Also the independent adjustment of the seed covering disks enables one of the disks to be arranged at a slightly different elevation from the other, which is advantageous in planting potatoes, where the ground is hilly.

The covering disks are connected with the rear transverse rock shaft by means of chains 58, or other suitable flexible connections, the lower ends of the chains are engaged with hooks 59, which extend upwardly from the arms 50 at points between the ends thereof, and the upper ends of the chains are detachably interlocked with toothed sector-shaped arms 60 of the rear transverse rock shaft. The sector-shaped arms 60 are provided with rectangular sleeves 61, which are secured by set screws, or other suitable fastening devices, to the rear transverse shaft, and the outer portions of the arms are provided with arcuate edges, having projecting teeth 62, spaced apart and corresponding to the openings of the links of the chains. The upper links of the chains are detachably interlocked with the arcuate edges of the arms 60, and as any of the links may be interlocked with the sector-shaped arms, the seed covering disks may be adjusted independently of each other through the medium of the chains.

This construction provides a quick adjustment, as the upper portion of either of the chains may be quickly detached from and engaged with the arms 60 of the rear rock shaft. When the rock shaft is rotated by the operating lever, the arms 60 are swung upward and downward, and the seed covering disks are correspondingly raised and lowered.

The seed covering disks are yieldably held in the ground by means of coiled springs 63, connected at their front ends to plates 64, which are bolted, or otherwise secured to the inner faces of the side bars 1 of the main or supporting frame. The rear ends of the springs are secured to lugs 65, which depend from the arms 50 at points between the ends thereof. The springs swing the arms 50 downwardly, and at the same time permit the said arms 50 to be swung upwardly by the operating mechanism for raising and lowering the seed covering disks and the furrow opening device.

Figure 4:
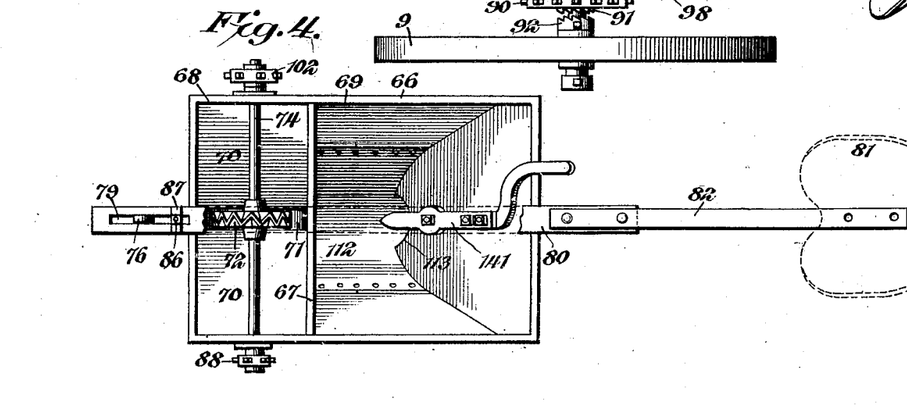
Fig. 4 is a plan view of the hopper.

Suitably mounted on the supporting frame is a hopper 66, which may be of any preferred construction, and which is divided by a transverse partition 67 into a front fertilizer compartment 68 and a rear potato compartment 69. The front fertilizer compartment 68 is provided with oppositely inclined lower walls 70, and it has a central pocket 71 of semi-cylindrical form. A feed wheel 72 operates in the narrow pocket or recess 71 at the bottom of the front fertilizer compartment 68, and is adapted to positively feed the fertilizer to a bottom discharge opening 73. The feed wheel 72 is provided with opposite peripheral recesses, formed by zigzagly arranged peripheral portions, as clearly illustrated in Fig. 4 of the drawings. The feed wheel is mounted on a transverse shaft 74, and the fertilizer, which is discharged through the opening 73, drops in rear of the furrow opening device, and falls into the furrow opened thereby. The discharge of the fertilizer is controlled by a slide 75, mounted in suitable guides at the lower portion of the hopper and extending through a slot of the front wall thereof, and connected at its front end with a lever 76. The lever 76 is fulcrumed at an intermediate point, being pivoted by a bolt 77 to a projecting portion of an L-shaped plate or bracket 78. The plate or bracket 78 is secured to the front wall of the hopper 66, and the lower arm of the lever 76 extends into a slot of the front end of the slide 75. The upper portion of the lever is arranged in a guide slot 79 of a longitudinal bar 80, mounted upon the top of the hopper, and extending along the median line of the machine, and projecting in advance and in rear of the said hopper. A seat 81 for the accommodation of the driver is connected with the rear projecting end of the longitudinal top bar 80 by a bar 82. The upper end of the lever 76 is connected with the front end of a longitudinally disposed operating rod 83, which is provided at its rear end with a ring 84 and which is also arranged in a rear guide 85. The rear guide consists of an L-shaped plate or bracket secured to and extending upwardly from the longitudinal top bar 80. The ring 84 forms a grip or handle, and is arranged within easy reach of the operator. The opening movement of the slide 75 may be controlled by an adjustable stop, consisting of a bolt 86 and upper and lower plates 87. The bolt 86 passes through the guide slot 79 at the rear portion thereof, and the plates 87 are arranged at the upper and lower faces of the bar 80, and extend across the slot 79. The stop is arranged in the path of the upper arm of the lever 76, and limits the rearward movement of the said upper arm.

The shaft 74, which extends beyond each side of the hopper, is provided at its left hand end with a pinion 88, which is connected by a sprocket chain 89 with a driving sprocket wheel 90, mounted on the axle at the left hand side of the machine, and provided with a clutch face or member 91, adapted to be moved into and out of engagement with a clutch face or member 92 of the adjacent carrying wheel 9. The clutch as operated by a shifting lever 93, extending longitudinally of the machine and located between the hopper and the sprocket wheel 90. The shifting lever, which is fulcrumed at its front end on a bracket or support 94 at a point in advance of the axle, is provided at an intermediate point with a depending fork 95, which engages an annular groove 96 of a hub extension of the sprocket wheel 90. The shifting lever, which extends in rear of the axle, has an upturned rear end 97, adapted to be engaged by the foot of the operator. The bracket 94 is secured to the left hand side bar 1 of the main frame, and the rear portion of the shifting lever is arranged within a keeper 98, secured to the left hand side bar 1 of the main frame and having a laterally projecting substantially L-shaped portion, which overhangs the shifting lever and which limits the outward movement of the lever. The upturned rear end of the shifting lever projects above the contiguous side bar of the main frame, and the shifting lever is adapted to be moved in either direction by the foot of the driver. The machine is provided at the rear walls of the hopper with a transverse bar 99, extending laterally from each side of the hopper and adapted to receive the feet of the operator. The projecting foot rest portions 100 of the transverse bar 99 are provided with upwardly projecting guards 101, consisting of curved plates secured to the lower face or edge of the transverse bar 99, and extending upward above the upper face of the same. The ends of the bar 99 are beveled, or rounded to conform to the configuration of the guards 101.

The front transverse shaft 74 is provided at the right hand side of the machine with a sprocket pinion 102, which is connected by a sprocket chain 103 with a sprocket wheel 104, mounted on a short transversely disposed rear shaft 105 and communicating motion to the mechanism for depositing the potatoes in the furrow. The short transverse shaft 105, which extends from one side of the machine to the central portion thereof, is journaled in suitable bearings of a bracket 106, constructed of cast metal, or other suitable material, and composed of a transverse portion and side portions, which are secured to the rearward extensions of the lower portions of the sides of the hopper. The transverse portion of the bearing bracket or frame 106 is provided at the right hand side of the machine with rearwardly extending bearing arms for supporting the shaft 105, and it has a central bearing 107 for the reception of an inclined longitudinally disposed shaft 108. The inner end of the shaft 105 is connected with the rear end of the inclined longitudinally disposed shaft 108 by beveled gearing, consisting of a pinion 109 and a gear 110, mounted respectively on the shafts 105 and 108. The front end of the inclined longitudinal shaft 108 is journaled in a suitable bearing 111 of a plate or bracket, which is secured to the rear wall of the rear compartment 69, exteriorly of the latter. The rear compartment 69 is provided with an inclined bottom or chute 112 of substantially semi-cylindrical form, adapted to direct the potatoes to a rotary carrier. The rear wall is provided at the bottom of the hopper with an outlet opening 113, and the inclined bottom or chute is provided with a rear extension 114, which projects in rear of the outlet opening. The rear end of the inclined semi-cylindrical bottom 112 is located at the lower portion of and is adapted to deliver the potatoes to the potato carrier, set at an inclination and consisting of a hollow cylindrical receptacle and comprising a spider 115 and a rim 116. The spider is suitably fixed to the shaft 108, and is arranged within the bearing frame or bracket, and the outer ends of the arms of the spider are bolted or otherwise secured to the rim 116. The rim 116, which rotates around a fixed disk or plate 117, is provided at intervals with potato carrying cups or flanges 118. The disk or circular plate 117 is connected with the rear wall of the hopper by a longitudinally disposed wall or partition 119, which extends upward from a bottom wall or partition 120. The walls or partitions 119 and 120, which are arranged at the right hand side of the machine, form a compartment 121, which extends in advance of the rotary potato carrier and which is intersected by a portion of the same. The disk or plate 117 is provided opposite the compartment 121 with an outlet opening 122, through which the potatoes are discharged by means of a yieldably mounted deflector 123. A substantially L-shaped delivery spout 124, which is hung from the bearing frame or bracket 106, has its upper portion arranged at the opening 122 to receive the potatoes. The delivery spout has a depending portion and a laterally extending arm, which receives the potatoes from the carrier.

Figure 5:
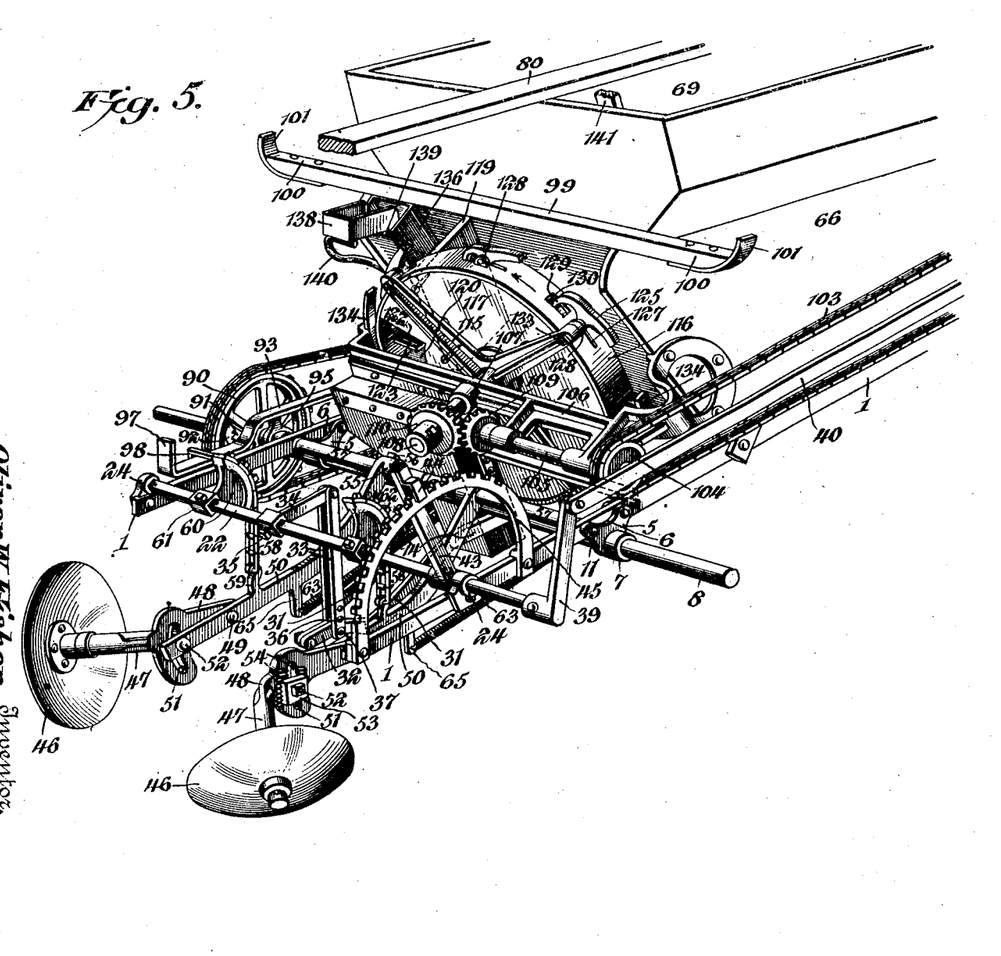
Fig. 5 is an enlarged perspective view of the rear portion of the machine, the carrying wheels and the seat being removed.
Figure 6:
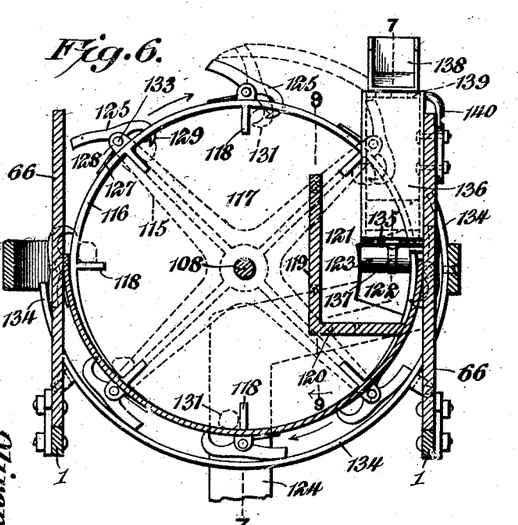
Fig. 6 is an enlarged sectional view, taken substantially on the line 6—6 of Fig. 2.
Figure 7:
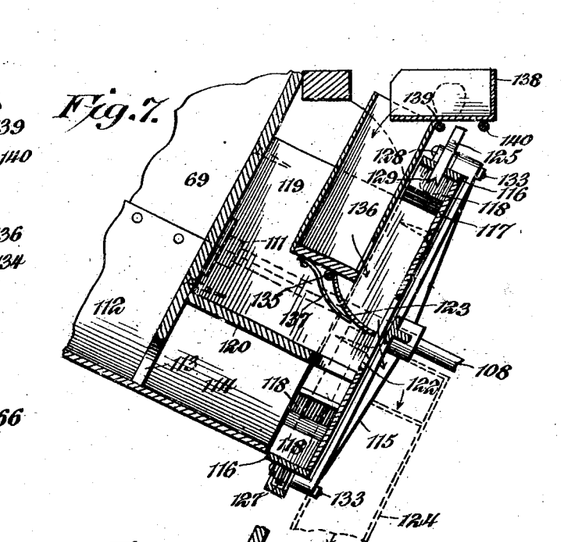
Fig. 7 is a sectional view, taken substantially on the line 7—7 of Fig. 6.
Figure 8:
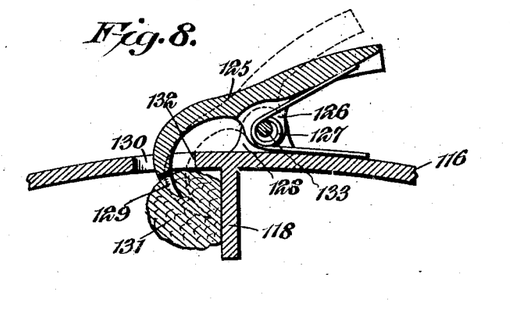
Fig. 8 is a detail sectional view, illustrating the construction of the potato clamping devices.
Figure 9:
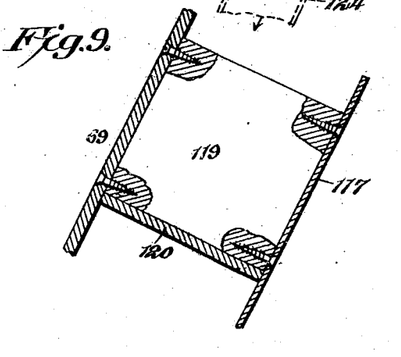
Fig. 9 is a detail sectional view taken substantially on the line 9—9 of Fig. 6.

The rotary carrier moves in the direction of the arrows in Figs. 5 and 6 of the drawings, the potatoes being conveyed across the machine from the right to left by the top portion of the carrier. The flanges 118, which pass through the potatoes at the lower end of the inclined bottom or chute, are each of a size to carry one potato or portion upward. The flanges 118 will positively carry a potato or portion upward until they are inverted or inclined downwardly by the rotary movement of the carrier. Prior to reaching such a position, the potatoes are automatically engaged and clamped on the flanges by pivoted devices, consisting of levers 125, provided at an intermediate point with projecting ears 126, spaced apart to receive an actuating spring 127 and pivoted between pairs of ears 128 of the rotary rim 116. One arm of each of the levers is curved and terminates in a bifurcated portion or claw 129, which is adapted to extend through a slot or opening 130 of the rotary rim, and which engages and embeds itself in the potato 131, whereby the potato is positively held on the flange 118 until it is released by the means hereinafter described. The sides of the bifurcated portion or claw are pointed to enable them to readily penetrate a potato. The inner end wall 132 of the slot 130 is arranged to form a stop for limiting the inward movement of the potato engaging arm of the lever, as illustrated in dotted lines in Fig. 8 of the drawings, whereby the points of the lever 125 are prevented from coming in contact with the flanges 118 and becoming dulled by such contact. Should the flanges 118 through any cause fail to carry a potato upward or retain it in position until engaged by the lever 125, the potato engaging arm will be swung to the limit of its inward movement by the spring 127 and will engage the said end wall 132. The spring 127 consists of two sides and a connecting coil; the coil is arranged on the pivot 133 of the lever, and the sides of the spring engage the rotary rim and the outer arm of the potato engaging lever. The spring is adapted to throw the potato engaging arm inward, when the lever is free to move, and the outer arm of the lever 125, during a portion of the rotary movement of the rim, is engaged by a curved cam or member 134, arranged beneath and spaced from the lower portion of the rotary rim and suitably secured to the rearwardly extending portions of the side walls of the hopper. The curved cam or member 134 is substantially semi-circular, and its right hand end terminates at a point about midway between the top and bottom of the carrier, so that the outer or rear arms of the potato engaging levers will be released as the flanges 118 rise from a horizontal position. The levers 125 will engage the potato before there is any tendency of the same to fall off the flanges 118.

The potatoes are released by the left hand terminal of the curved cam or member 134, which engages the rear or outer arm of each lever and moves the inner or engaging arm outward, thereby permitting the potato to drop, when it reaches the left hand side of the machine, and is at a point above the outlet 122. The potato is directed through the outlet by the deflector 123, which is slightly curved and which is hinged at its upper edge 135 to the bottom of an inclined chute 136. The deflector, which extends downwardly and rearwardly, is adapted to cause the potatoes to pass through the outlet 122, and it is engaged by a spring 137, which bears against the lower face of the deflector. The spring is suitably mounted on the chute 136 at the lower end thereof, and it permits the deflector to swing backward to allow the flanges 118 to pass it.

When the engaging portion of the lever 125 is at the limit of its inward movement, which will occur, should there be no potato on the flanges 118, when the lever is released by the curved cam or member 134, the outer arm of the lever 125 will then extend beyond the position occupied by it, when the inner arm is in engagement with a potato, and the said outer arm is adapted, when in its extended position, to trip a pivoted receptacle 138 for dropping a potato into the chute 136, whereby a positive and effective dropping of the potatoes is assured. The receptacle 138, which is substantially oblong, is open at the inner or front end and at the top, and it is suitably hinged or pivoted at its bottom at 139. The hinged connection between the receptacle and the chute 136 is located at a point between the front and rear ends of the receptacle, and the outer or rear end, which is arranged in the path of an extended outer arm of the levers 125, is adapted to be thrown upward by the same. A potato is placed in the pivoted receptacle 138 by the driver, and should any one of the levers 125 miss a potato, the receptacle will be tilted, so that the potato will be deposited to supply the place of the one missing from the rotary carrier. In practice, the driver or operator will carry two or three potatoes or portions in his pocket, so that the pivoted receptacle may be instantly supplied as soon as it is emptied. The outer or rear portion of the pivoted receptacle is preferably of greater weight than the inner or front portion, so that after the potato is emptied into the chute, the receptacle will drop back to its initial position. The outer or rear portion of the pivoted or tiltable receptacle 138 normally rests upon an arm of a support 140, consisting of a rod or bar provided at its front with an attachment plate or portion, and having the said arm at its rear end. The attachment plate or portion is secured to the extension of the left hand side of the hopper, and the arm extends transversely of the machine and is arranged beneath the bottom of the tiltable receptacle.

Should the potatoes clog at the opening 113 of the rear wall of the hopper, they may be agitated by a lever 141, fulcrumed at an intermediate point on the inner face of the rear wall of the hopper and extending from the bottom to the top thereof, and provided with a handle portion arranged within easy reach of the driver or operator. The lower portion of the lever is centrally arranged and the upper portion is bent laterally, as clearly shown in Fig. 4 of the drawings, to clear the rear portion of the longitudinal top beam.

Having thus fully described my invention, what I claim as new and desire to secure by Letters Patent, is:—

1. The combination of a hopper provided at the bottom with an outlet and having a rearward extension, a rotary potato carrier operating at the rear end of the extension, and a movable potato deflector arranged in the path of the potato carrier.

2. The combination of a hopper provided with a substantially semi-cylindrical bottom extending beyond the rear wall of the hopper, a rotary potato carrier set at an inclination, and a yieldably mounted deflector arranged in the path of the potato carrier.

3. The combination of a hopper, a potato carrier, a delivery spout or chute located in rear of the carrier, and a movably mounted deflector yieldably arranged in the path of the carrier for directing the potatoes into the delivery spout or chute.

4. The combination of a hopper, a rotary potato carrier set at an inclination, an inclined delivery spout located in rear of the rotary potato carrier, and a movably mounted deflector yieldably held in the path of the potato carrier for directing the potatoes into the delivery spout.

5. The combination of a hopper, a delivery spout or chute located in rear of the hopper, a rotary potato carrier interposed between the hopper and the delivery spout, and an inclined deflector yieldably held in the path of the rotary carrier for directing the potatoes into the delivery spout.

6. The combination of a hopper, a delivery spout or chute located in rear of the hopper, a rotary potato carrier interposed between the hopper and the delivery spout, an inclined deflector hinged at the top, and a spring for yieldably holding the deflector in the path of the rotary carrier.

7. The combination of a hopper, a delivery spout located in rear of the hopper, a rotary potato carrier interposed between the hopper and the delivery spout and consisting of a rotary rim having potato carrying means, a disk or plate arranged at the back of the potato carrier and provided with an outlet communicating with the delivery spout, and a deflector located within the said rim for directing the potatoes through the opening of the disk or plate.

8. The combination of a hopper having an inclined bottom extending in rear of the hopper, said hopper being also provided above the projecting portion of the bottom with a compartment, a rotary potato carrier set at an inclination and arranged in rear of the compartment and the said extension of the bottom, a delivery spout located in rear of the potato carrier, and a deflector mounted within the said compartment and extending into the path of the potato carrier for directing the potatoes into the delivery spout.

9. The combination with a hopper, of a rotary potato carrier consisting of a rotary rim provided with projecting potato carrying portions, spring actuated potato engaging devices mounted on the rim, and means located in the path of the said devices for holding the same in a retracted position during a portion of the rotary movement of the carrier and for releasing the devices to permit the same to engage the potatoes during another portion of such rotary movement.

10. The combination with a hopper, of a rotary potato carrier consisting of a rim provided with inwardly projecting potato carrying portions, exteriorly arranged spring actuated potato engaging devices, and means located in the path of the said devices for holding the same out of engagement with the potatoes during a portion of the rotary movement of the carrier and for releasing the said devices to permit them to engage the said potatoes during another portion of such rotary movement and for also reëngaging the said devices to release the potatoes.

11. The combination with a hopper, of a rotary potato carrier consisting of a rim provided with inwardly projecting potato carrying portions, exteriorly arranged spring actuated potato engaging devices, and a curved cam or member arranged in the path of the said devices for holding the same out of engagement with the potatoes and for releasing the devices to permit them to engage the potatoes.

12. The combination with a hopper, of a rotary potato carrier comprising a rim having inwardly projecting potato carrying flanges, spring actuated levers mounted on the rim and arranged to engage the potatoes and provided with outwardly projecting portions, and a curved member arranged in the path of the outwardly projecting portions of the levers for holding the same out of engagement with the potatoes during a portion of the rotary movement of the carrier.

13. The combination of a rotary rim having an inwardly projecting potato carrying flange, a potato engaging lever fulcrumed at an intermediate point and having an inner potato engaging arm, and means located in the path of the lever for engaging the other arm to hold the lever out of engagement with the potato during a portion of the rotary movement of the rim.

14. The combination of a rotary rim having an inwardly projecting flange and provided with a slot, an exteriorly arranged lever mounted on the rim and provided with a potato engaging arm arranged to extend through the slot and having its inward movement limited by one of the walls of the slot to prevent it from coming in contact with the potato carrying flange, and means located in the path of the lever for disengaging the same from a potato and for holding it out of such engagement during a portion of the rotary movement of the rim.

15. The combination of a rotary rim having interior potato carrying means, a spring actuated lever fulcrumed at an intermediate point on the exterior of the rim and provided at one of its arms with a potato engaging claw, said rim being provided with means for limiting the inward movement of the claw, and means for moving the lever out of engagement with a potato to release the same.

16. The combination of a hopper, a delivery spout, a rotary carrier having spring actuated potato engaging devices movable inwardly and outwardly, the outward movement being limited by the potatoes, means for operating the said devices to release the potatoes, and means for holding a potato, said means being located in the path of the said devices when the same are at the limit of their outward movement and adapted to be operated to deliver a potato to the said spout.

17. The combination of a hopper, a delivery spout, a potato carrier having potato engaging means for conveying potatoes from the hopper to the spout, and a tiltable potato receptacle, said potato engaging means being adapted to tilt the receptacle to deliver a potato to the spout should any one of the potato engaging means fail to obtain a potato at the hopper.

18. The combination of a hopper, a potato carrier provided with potato engaging means movable inwardly and outwardly and having their outward movement limited by the potatoes, and a tiltable receptacle arranged in the path of the potato engaging means when the same are at the limit of their movement.

19. The combination of a potato carrier provided with spring actuated potato engaging levers movable inwardly and outwardly and having their outward movement limited by the potatoes, and a tiltable receptacle arranged in the path of the levers when the same are at the limit of their outward movement.

20. The combination of a hopper, a delivery spout, a chute communicating with the spout, a tiltable receptacle arranged to discharge into the chute, and a potato carrier having movable potato engaging means, the outward movement of the said means being limited by the potatoes and the receptacle being arranged in the path of the potato engaging means when the same are at the limit of their outward movement.

21. The combination of a hopper, a delivery spout, a chute communicating with the spout, a tiltable receptacle arranged to empty into the chute, a potato carrier having means for engaging the potatoes to carry the same from the hopper to the spout, and means for tilting the receptacle to deliver a potato to the spout should any one of the potato engaging means fail to obtain a potato from the hopper.

22. The combination of a hopper, a delivery spout, a chute communicating with the spout, a receptacle pivotally mounted at a point between its ends on the spout and extending inwardly over the same, the outer portion of the receptacle being heavier than the inner portion, a support for the outer portion of the receptacle, and a carrier provided with potato engaging means movable inwardly and outwardly and adapted, when at the limit of their outward movement, to engage the receptacle to tilt the same.

23. The combination of a hopper, a delivery spout, a chute communicating with the spout, a tiltable receptacle mounted on the spout for discharging a potato into the same, a rotary carrier having movable potato engaging means and arranged to tilt the receptacle when at the limit of their movement, and a deflector located at the bottom of the chute for directing the potatoes into the delivery spout.

24. The combination of a hopper, a transversely disposed bearing frame or bracket secured to the hopper at opposite sides thereof and extending rearwardly therefrom, a longitudinal shaft journaled in suitable bearings of the hopper and the said frame or bracket, a delivery spout hung from the bearing frame or bracket, a rotary carrier mounted on the shaft and provided with means for conveying the potatoes from the hopper to the spout, and gearing for operating the shaft.

25. The combination of a wheeled frame, a hopper mounted on the frame and having fertilizer and seed compartments, fertilizer feeding means, potato dropping mechanism, gearing for communicating motion from a wheel of a frame to the potato dropping mechanism and to the fertilizer feeding means, said gearing having a clutch, a lever located exteriorly of the frame and extending along one side of the same and connected with the clutch, said lever being provided with a foot engaged portion, and a keeper extending laterally from the frame and overhanging the lever.

26. The combination of a hopper, a transversely disposed bearing frame or bracket mounted on and extending rearwardly from the hopper, a longitudinal shaft supported by the hopper and by the frame or bracket, a rotary potato carrier mounted on the shaft and having exteriorly arranged potato engaging levers, and a curved member supported by the frame or bracket and arranged in the path of the levers.

27. The combination with a hopper, and a delivery spout or chute, of means for carrying seed from the hopper to the spout or chute, and yieldable means arranged in the path of the said means for deflecting the seed to the delivery spout or chute, said yieldable means being adapted to be moved out of the path of the potato carrying means by the latter.

28. The combination with a hopper, and a delivery spout or chute, of a potato carrier provided at intervals with potato carrying means, and movable means arranged in the path of the potato carrier for deflecting the potatoes to the delivery spout or chute, said movable means being adapted to be moved out of the path of the potato carrier by the latter.

29. A dropping device for potatoes and the like consisting of a hollow revolving receptacle having one or more pointed potato-engaging devices mounted exteriorly on the receptacle and arranged to penetrate the interior thereof, means for forcing the potato-engaging device into the receptacle at a point in its revolution, means for withdrawing it at another point, and means for conducting the released potatoes exteriorly of the receptacle.

30. The combination of a hollow revolving receptacle provided with inwardly projecting flanges or lugs, potato-engaging devices pivotally mounted exteriorly on the receptacle, means for forcing each potato-engaging device into the receptacle at one point in its revolution, and means for withdrawing each potato-engaging device at another point.

31. The combination with a hopper, of a hollow revolving receptacle communicating therewith, potato-engaging devices pivotally mounted exteriorly on the receptacle, springs for forcing said potato-engaging devices into the receptacle, and means located at a particular point in the revolution of the receptacle for withdrawing the potato-engaging devices.

32. A dropping device for potatoes and the like consisting of a hollow revolving receptacle having one or more potato-engaging devices mounted exteriorly on the receptacle and arranged to penetrate the interior thereof, and means located in the path of the said devices for holding the same in a retracted position during a rotary movement of the carrier and for releasing the devices to permit the same to engage the potatoes during another portion of such revolution.

33. A dropping device for potatoes and the like consisting of a hollow revolving receptacle having one or more potato-engaging devices mounted exteriorly on the receptacle and arranged to penetrate the interior thereof, and a curved cam or member arranged in the path of the said devices for holding the same out of engagement with the potatoes and for releasing the devices to permit the same to clamp the potatoes.

34. A dropping device for potatoes and the like consisting of a hollow revolving receptacle, one or more potato-engaging devices consisting of levers pivotally mounted exteriorly of the receptacle and arranged to penetrate into the interior thereof, and a curved cam arranged in the path of the levers for holding the same out of engagement with the potatoes during a portion of the rotary movement of the receptacle and for releasing the levers to permit the same to engage the potatoes.

35. A dropping device for potatoes and the like consisting of a hollow revolving receptacle, one or more potato-engaging devices consisting of levers pivotally mounted exteriorly of the receptacle and arranged to penetrate into the interior thereof, springs for forcing the levers into the receptacle, and a cam or member arranged in the path of the lever for holding the same out of engagement with the potatoes during a portion of the rotary movement of the carrier for releasing the levers to permit them to engage the potatoes.

In testimony that I claim the foregoing as my own, I have hereto affixed my signature in the presence of two witnesses.

OLIVER W. FISHER.

Witnesses:
 WM. R. PEOPLES,
 J. CLYDE BROWN.